United States Patent [19]

Kruse

[11] 4,365,527
[45] Dec. 28, 1982

[54] AUTOMATIC WIRE CONNECTOR ATTACHING APPARATUS

[75] Inventor: Robert W. Kruse, Rockford, Ill.

[73] Assignee: Gardner Bender, Inc., Milwaukee, Wis.

[21] Appl. No.: 250,842

[22] Filed: Apr. 3, 1981

[51] Int. Cl.³ ............................................. B25B 23/04
[52] U.S. Cl. ........................................ 81/431; 29/240
[58] Field of Search .................... 81/431, 57.2; 29/240

[56] References Cited

U.S. PATENT DOCUMENTS

| | | | |
|---|---|---|---|
| 2,575,525 | 11/1951 | Mitchell | 81/431 |
| 3,016,774 | 1/1962 | Minobe | 81/431 |
| 3,034,547 | 5/1962 | Cox et al. | 81/431 |
| 3,258,042 | 6/1966 | Ruminsky | 81/431 |

*Primary Examiner*—James L. Jones, Jr.

*Attorney, Agent, or Firm*—James E. Nilles

[57] ABSTRACT

An apparatus for automatically rotating screw-on connectors onto the stripped ends of electric wires, including an elongated housing having an inlet opening at one end for the reception of the connectors and an outlet opening at the other end for their discharge. The connectors are received in a rotatable and hollow drive shaft in the housing, and a sleeve is concentric with, around, and rotatable with the drive shaft. A plurality of fingers with a free end are secured to one end of the sleeve, which is axially movable towards the outlet opening by manually operated cam means acting between the housing and sleeve. Upon this axial movement, the fingers engage cam surfaces in the drive shaft and adjacent the outlet opening to cause gripping engagement of those fingers with a connector located adjacent the outlet opening.

9 Claims, 8 Drawing Figures

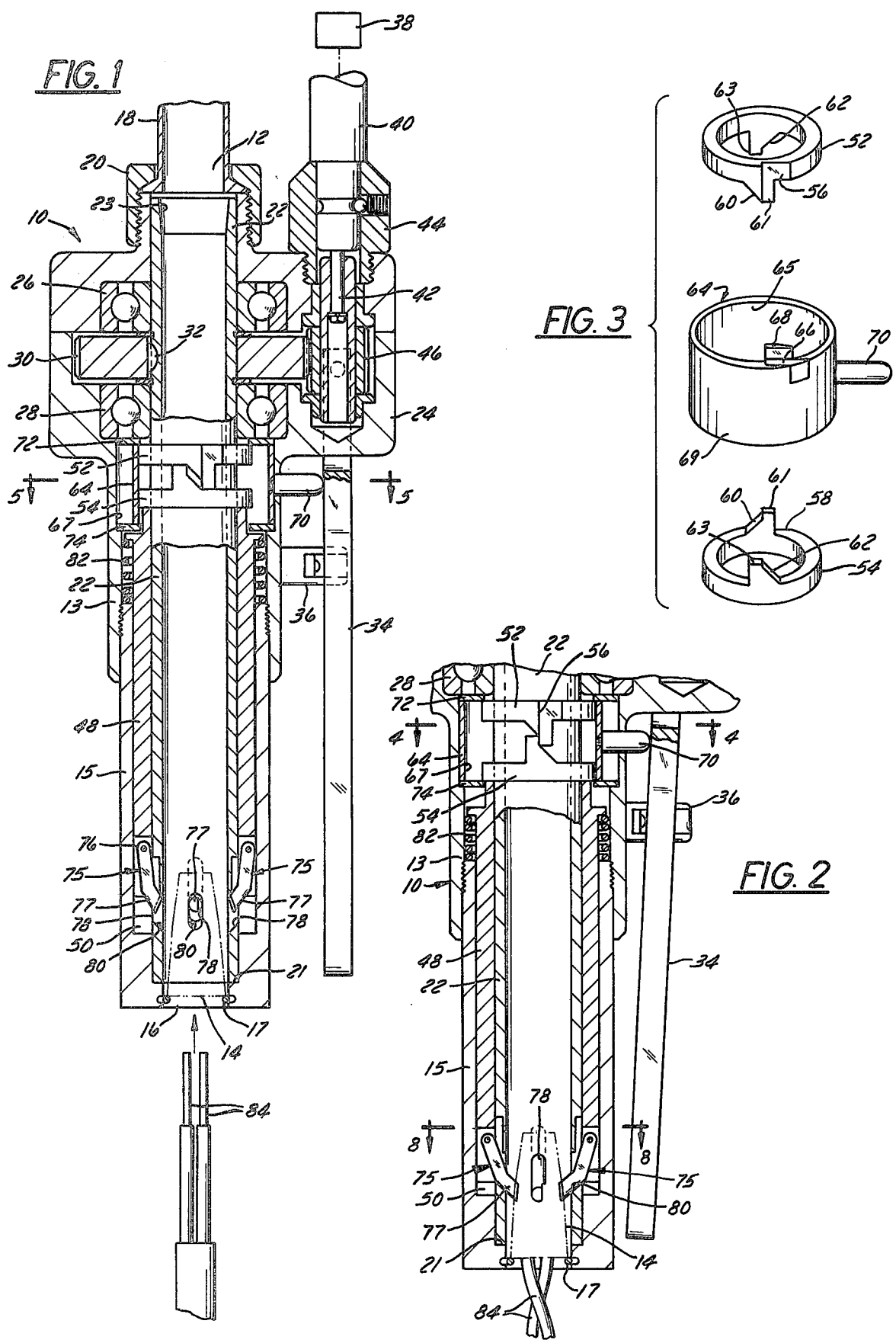

AUTOMATIC WIRE CONNECTOR ATTACHING APPARATUS

BACKGROUND OF THE INVENTION

The invention relates in general to an apparatus for rotating a screw-on connector onto the stripped ends of electric wires and thus securing them together.

Apparatus for attaching such screw-on connectors is known in the art, a typical unit being shown in U.S. Pat. No. 3,016,774, issued to M. M. Minobe on Jan. 16, 1962, which includes an elongated housing with an inlet for receiving the connectors and an outlet adjacent a turning station where the wires are twistably secured together and to the connector. A drive shaft positioned within the housing has a plurality of jaws secured to one of its ends, and the drive shaft is axially movable from a lower turning position, in which the jaws abut a cam surface to pivot inwardly and thereby grip the connector, to an upper position in which the connectors are released by the jaws. The cam surface is adjacent the outlet opening and is either fixedly or rotatably mounted to the elongated housing.

Such an apparatus has some disadvantages which make it relatively more expensive to operate and maintain. For example, in the Minobe U.S. Pat. No. 3,016,774 embodiment having a fixedly mounted cam surface the jaws contact the surface and are pivoted inwardly to grip a connector. As the jaws are being rotated about the end of a lower power shaft, they continuously slide against the cam surface and both the surface and the jaws are thereby subject to considerable wear. The Minobe patent embodiment having a rotatably mounted cam surface is subject to less wear, as the axially-movable lower shaft is lowered until the rotating jaws engage that surface to cause its rotation at substantially the same speed and to thereby reduce relative movement between the jaws and the cam surface. However, this arrangement requires the transmission of considerable torque by the lower power shaft so that the inertia of the cam surface and bearing about which it rotates may be overcome.

Furthermore in the said Minobe patent device, the lower and an upper shaft by which the lower shaft is driven are axially spaced apart and interengageable along a pair of cam surfaces which together effectively function as a slip clutch. The lower shaft on which the jaws are rotated is not directly driven by the upper shaft until the jaws grip the connector, at which point the jaws are in abutting engagement with the cam surface. Thus, the upper shaft must be rotating at a high, energy consuming speed before coming into direct driving contact with the lower shaft. This arrangement is further wasteful of energy in that the upper shaft, prior to direct driving engagement with the lower shaft, rotates without performing any useful work.

SUMMARY OF THE INVENTION

The present invention provides an apparatus for automatically rotating screw-on connectors onto the stripped ends of electric wires, including an elongated housing having an inlet opening at one end for the reception of the connectors and an outlet opening at the other end for their discharge. The connectors are received in a rotatable but axially fixed, hollow drive shaft in the housing, and concentric sleeve surrounds the drive shaft. A plurality of fingers each having a free end are secured to one end of the sleeve, and the sleeve is axially movable towards the housing outlet opening by manually operated cam means acting between the housing and sleeve. As a result of this axial movement, the fingers engage cam surfaces which are formed in the drive shaft and are located adjacent the outlet opening to cause those fingers to grip a connector located adjacent the outlet opening.

A more specific aspect of the invention may include fingers that are inwardly pivotally mounted to the sleeve and which pivot through slot means defining the cam surfaces upon engagement with those cam surfaces. The cam means may include a pair of cam elements urged to an axially spaced-apart position by a cam actuator. Rotation of the drive shaft may be commenced substantially simultaneously with axial movement of the sleeve by providing lever means on the housing which simultaneously engages the cam actuator and a switch for driving an electric motor coupled to the drive shaft.

The present apparatus includes fingers mounted on a sleeve that is rotated at the same speed as its power-transmitting drive shaft. As the cam surfaces are part of the drive shaft, the fingers do not slide upon a stationary cam surface, nor engage a cam surface that is rotatably secured to the housing and whose inertia must be overcome by the rotating fingers. The drive shaft begins rotation upon axial movement of the sleeve to urge the fingers into gripping engagement with a connector, so that power is consumed by the apparatus essentially only when useful work is being performed. The placement of the cam surfaces on the drive shaft enables the apparatus to operate at relatively low speeds and torques.

Other objects and advantages of the invention will appear throughout the specification.

BRIEF DESCRIPTION OF THE DRAWINGS

FIG. 1 is a vertical cross sectional view of an apparatus constructed in accordance with the invention, showing the fingers in non-engaging relationship with a connector (in phantom), and further showing a pair of electric wires adjacent the outlet opening;

FIG. 2 is a fragmentary, elevational view of the apparatus of FIG. 1 with the lever engaging the stem of the cam actuator to urge the cam elements to their axially spaced-apart position whereby the sleeve is moved towards the outlet opening and the fingers grippingly engage and rotate the connector to twistingly secure the stripped ends of a pair of insulated wires;

FIG. 3 is an exploded, perspective view on an enlarged scale, of the interengaging and cooperating cam elements and of the cam actuator for engaging the elements and for urging them to axially spaced apart positions;

DESCRIPTION OF A PREFERRED EMBODIMENT

Figure 4:
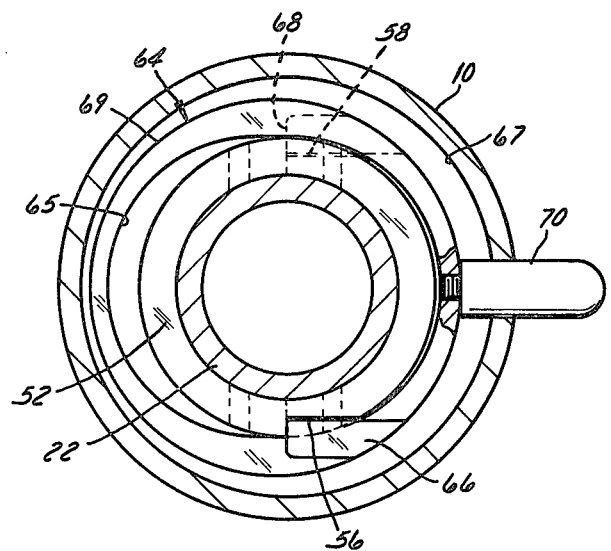
FIG. 4 is a sectional view taken along line 4—4 of FIG. 2, but on an enlarged scale.

A hand-held apparatus in accordance with the invention is shown in FIG. 1 and includes an elongated, generally cylindrical housing 10 having an inlet opening 12 in the upper housing 13 for receiving screw-on connectors 14. The lower end of the housing, or lower housing 15, includes an outlet opening 16 (FIG. 1) through which the connectors may be discharged and further includes U-shaped wire bail 17 for retaining the connector until it has been attached to the wires. A flexible tube 18 or other hollow conduit facilitates transport of the connectors 14 from a remote location, as for example from an overhead hopper (not shown), to the inlet opening 12 and is preferably secured to the housing with a threadable coupling 20.

Means are provided for rotating a connector positioned adjacent the outlet opening and include an axially fixed but rotatable hollow drive shaft 22 extending substantially along the entire length of the housing and within a counterbore 21 in lower housing 15. The junction of the inlet opening and flexible tube 18 has an outwardly flared position 23 (FIG. 1) to facilitate passage of the connectors 14. The housing includes a chamber 24 in which a pair of axially spaced apart bearings 26 and 28 may be provided for the rotatable securing of the drive shaft. A drive gear 30 between the bearings and held with a key 32 to the drive shaft 22 connects the latter to a power source. A lever 34 is pivotally mounted to and alongside the housing, and may be squeezed towards the housing by an operator to actuate a switch 36 for controlling power to an electric motor 38. As the motor 38 is generally located remotely from the apparatus, power transmission means are required between the motor and gear 30 and may include a flexible shaft or wire 40 secured to a shaft 42 with a coupling 44 threadably engaged in the housing. A pinion 46 secured to the shaft 42 is meshed with the gear 30 to complete the means for power transmission to the drive shaft 22.

A sleeve 48 is concentric with, radially outwardly of, and rotatable with the drive shaft 22. Sleeve 48 is axially and telescopingly movable with respect to the drive shaft 22.

Figure 7:
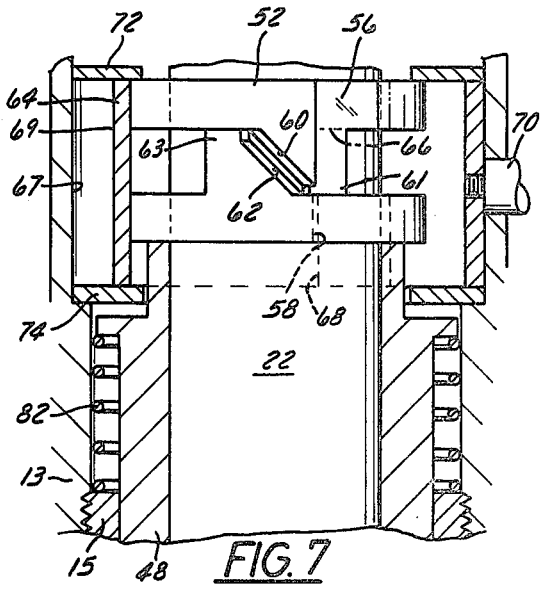
FIG. 7 is a fragmentary, elevational view, partially in section, of the apparatus of FIG. 1 but on an enlarged scale, and in the non-gripping position.
Figure 8:
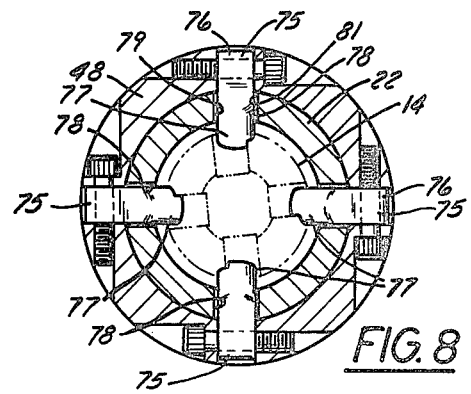
FIG. 8 is a sectional view taken along line 8—8 of FIG. 2, but on an enlarged scale.

Manually-operated cam means are provided for axially moving the sleeve 48 relative to the drive shaft and towards the outlet opening, and comprises a pair of interengaging and cooperating cam elements mounted around the drive shaft for limited relative rotation. The cam elements 52 and 54 are generally cylindrical collars and have notches 56 and 58 along their respective outer surfaces for engagement by keys, as will be explained below. As may be seen in FIG. 3, ramps 60 and 62 extend from each cam element and each ramp includes a surface along which a tab 61 and 63 rides during the limited relative rotation. The axial extremity of each tab, that is, the lowermost part of tab 61 and the uppermost part of tab 63, abut cam elements 54 and 52 respectively when those elements are in their adjacent, non-spaced apart position (FIGS. 1 and 7).

A cam actuator 64, having a circular outer surface 69 (FIGS. 4 and 5) and an oblong shaped inner surface 65, is retained within a bore 67 of the housing, and is of larger diameter than the cam elements so as to enclose them. The actuator 64 includes inwardly extending keys 66 and 68 for engaging the respective notches 56 and 58. A stem 70 is threadably attached to and extends radially from the cam actuator 64 and through the housing 10. The free or unattached end of the stem 70 abuts and is movable by the lever 34 to shift the cam actuator 64 laterally within the bore 67, the shifting being guided by annular washers 72 and 74 defining the axial ends of the bore 67 and which are secured to the housing and coaxial with the drive shaft 22. During radially inward movement of the stem and the consequent shifting of the actuator 64 from the position shown in FIG. 7 to that shown in FIG. 6, the keys engage their respective notches 56 and 58. The cam elements have a slip fit arrangement around the drive shaft, and the contact of the transversely movable keys with the notches causes rotatable rather than transverse movement of the cam elements. Specifically, the keys tend to drive the lower cam in a counterclockwise and the upper cam in a clockwise direction, the directions being with respect to FIGS. 4 and 5. This rotation causes slidable relative movement of the tabs 61 and 63 along ramps 62 and 60, respectively, and forces the cam elements into the axially spaced apart position shown in FIG. 6. As cam element 52 is axially immovable because of its placement adjacent the washer 72, any relative axial movement between the cam elements must be acommodated by the movement of cam element 54 towards washer 74. Upon reaching the spaced-apart positions shown in FIG. 6, tabs 61 and 63 no longer slide upon the ramps but instead abut each other along their vertically facing surfaces to prevent further relative rotation of cam elements 52 and 54. Alternatively, washer 74 may also serve as a lower axial stop for element 54 to limit relative rotation of the cam elements.

Figure 5:
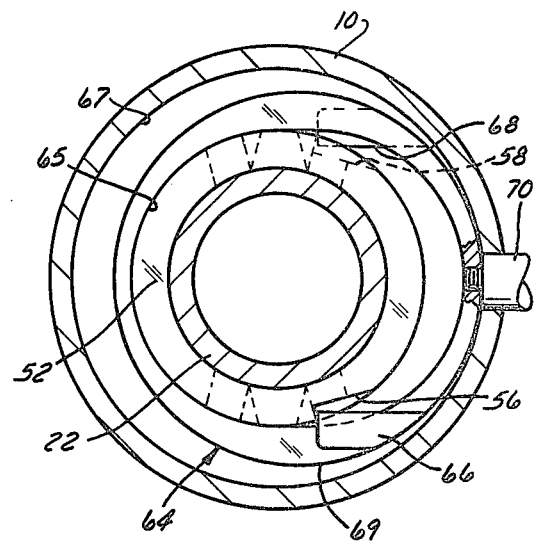
FIG. 5 is a sectional view taken along line 5—5 of FIG. 1, but on an enlarged scale.
Figure 6:
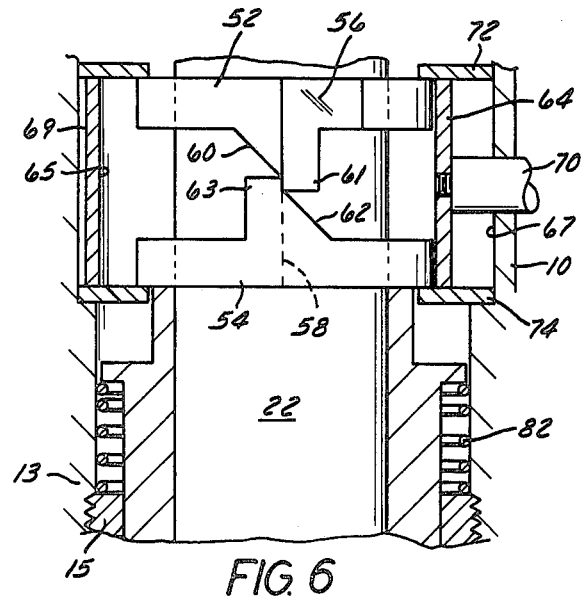
FIG. 6 is a fragmentary, elevational view, partially in section, of the apparatus of FIG. 2 but on an enlarged scale and showing the cam means and also showing the sleeve after its axial movement towards the outlet opening by the cam means to cause gripping of a connector.

Means are further provided for grippingly engaging the connector at the outlet opening end of the connector rotating means, and for radially inwardly moving the gripping means. The gripping means comprises a plurality of fingers 75 having one end 76 pivotably secured to the sleeve and also having a free end 77. The drive shaft 22 has a plurality of slots 78 which form cam surfaces 80 adjacent the outlet opening 16. The cam surfaces 80 are inclined downwardly and inwardly towards the outlet opening 16. The sleeve 48 is axially movable due to axial movement of the cam element 54. When the cam elements are adjacent one another as shown in FIGS. 1, 5 and 7, the sleeve is in a cammed-up position, and the free ends 77 of the fingers 75 extend, only partially into the slots 78, as shown in FIG. 1. When the cam elements are axially spaced apart as shown in FIGS. 2, 4 and 6, the sleeve has been forced downwardly so the fingers 75 engage the cam surfaces 80 and are thereby pivoted inwardly until their free ends 77 grip a connector 14. Thus, each finger 75 extends at least partially into its slot 78 whether the sleeve is in the cammed up or cammed down position.

Resilient means are further provided for urging the sleeve away from the outlet opening so that the fingers release their grip after the wires have been secured in the connector and the lever has been released. This means includes a coil spring 82 acting between the sleeve, the upper housing 13, and the lower housing 15, so that when the sleeve is extended to its lower or cammed down position, upon squeezing of the lever 34 by an operator, the spring will be compressed. Upon release of the lever 34, the spring will return the sleeve to its cammed-up position, the upward movement of the sleeve being limited by the upward limit of travel of the cam element 54 as provided by cam element 52.

OPERATION OF THE APPARATUS

An operator will typically grasp the housing 10 of the apparatus in one hand, and in the other hand will grasp the wire ends to be secured to a connector automatically fed to the outlet end of the housing. Several connectors are generally housed within the hollow portion of the drive shaft 22 at any one time, and are stacked on top of one another with their respective narrow and wide ends abutting so that each will be fed with its wide and open end facing the stripped ends of the electric wires 84. A connector is in place and is ready to be gripped with the fingers 75 when it is located as shown in FIG. 1.

Before inserting the wires 84 through the outlet opening, the connector is rotating and secured against axial movement. The operator thus grasps the lever 34 to squeeze it inwardly and towards the housing (FIG. 2), which causes transverse movement of the cam actuator and engagement of the notches 56 and 58 of cam elements 52 and 54 by keys 66 and 68, and results in relative rotation of the cam elements. The lower cam element 54, in response to the rotation and the resultant sliding of the tabs on the ramps, moves towards the outlet opening to axially shift the sleeve in that same direction and to cause inward pivoting of fingers 75 upon contacting cam surfaces 80 until the fingers grippingly engage the connector to secure the connector against axial movement. The squeezing of lever 34 simultaneously actuates electric motor switch 36, and electric motor 38 begins rotating the drive shaft 22 which in turn drives the sleeve 48 through its fingers 75. Because the drive shaft 22 and sleeve 48 begin rotation simultaneously and as the fingers each extend at least partially into their respective slots regardless of the position of the sleeve, the fingers always remain adjacent the same slot. The drive shaft rotates at the same speed and in the same direction as the sleeve and there is no relative rotation between them. Thus the drive shaft and sleeve need not overcome rotational inertia of the cam surfaces, and wear of the fingers and cam surfaces is minimized. Because the rotatable cam surfaces are part of the drive shaft and not mounted to the housing, there is no need for a bearing about which a housing-mounted cam surface would rotate.

When power is being provided to the motor and the sleeve has been moved axially towards the outlet opening, the operator can push the wires 84 into the outlet opening 16. Upon insertion of the wires 84 through the outlet opening as the motor rotates a connector, the wires are twistably engaged to one another and secured to the threaded inner surfaces of the connector.

The invention provides an apparatus in which the fingers are urged inwardly upon contacting a cam surface that is rotatable with those fingers and whose inertia need not be overcome by the drive shaft and sleeve. At least a part of the fingers is always adjacent and between the side walls 79 and 81 of the slots 78, and rotation of the drive shaft 22 therefore always causes rotation of the fingers and sleeve. Thus, whenever drive shaft 22 is rotated, the fingers are being rotated and useful work is being performed.

In addition, the extent of axial movement of the cam element 54 towards outlet opening 16 determines the extent of pivotal, inward movement of the fingers 75 towards a connector 14. For example, the fingers will need to pivot inwardly only a small amount in order to grip a large connector within the drive shaft, and thus a relatively small axial movement of element 54 towards outlet opening 16 is required. With a smaller connector, such as that shown in FIG. 2, the fingers must pivot inwardly a substantial amount and the cam element 54 may need to move to its axial limit as provided by tabs 61 and 63 or shoulder 74. This variability in the axial movement of cam element 54 serves as a means for compensating for wear in the free ends 77 of fingers 75 or elsewhere in the axially shiftable portion of the apparatus.

Because the cam surfaces and fingers never rotate with respect to one another, the drive shaft, sleeve, and fingers need not overcome the angular inertia of a housing-mounted cam surface and their rotation will require only a relatively low starting torque.

Finally, the lever 34 is returned to its biased position, in which the cam elements are adjacent and nonaxially spaced apart (FIG. 1), by the same coil spring 82 which urges the sleeve away from the outlet opening, and there is thus no need for a separate lever biasing spring.

What I claim is:

1. In an apparatus for automatically rotating screw-on connectors onto the stripped ends of electric wires, an elongated housing with an inlet opening at one end for the reception of said connectors and an outlet opening at the other end for the discharge thereof, a rotatable and hollow drive shaft in said housing, said connectors being received in said hollow drive shaft, cam surfaces in said drive shaft and adjacent said outlet opening, a sleeve concentric with and around said drive shaft and rotatable therewith, a plurality of fingers secured at one end to said sleeve and each having a free end, manually operated cam means acting between said housing and said sleeve for axially moving said sleeve toward said outlet opening to cause engagement of said fingers with said cam surfaces and gripping engagement of said fingers with a connector located adjacent said outlet opening.

2. The apparatus set forth in claim 1 further characterized in that said drive shaft has a plurality of slots which define said cam surfaces, said fingers being pivotally mounted on said sleeve and extending through said slots, said fingers being inwardly pivotable upon engagement with said cam surfaces to engage a connector adjacent the said outlet opening.

3. The apparatus set forth in claim 1 further characterized in that said manually operated cam means includes a pair of inter-engaging and cooperating cam elements mounted around said drive shaft for limited relative rotation, one of said elements bearing against said housing and the other element bearing against said sleeve, and a cam actuator engaging said cam elements for urging them to an axially spaced apart position whereby said sleeve is axially moved towards said outlet opening, and spring means for urging said sleeve axially in an opposite direction whereby said fingers are withdrawn from said connector.

4. The apparatus set forth in claim 2 further characterized in that said manually operated cam means includes a pair of inter-engaging and cooperating cam elements mounted around said drive shaft for limited relative rotation, one of said elements bearing against said housing and the other element bearing against said sleeve, and a cam actuator engaging said cam elements for urging them to an axially spaced apart position whereby said sleeve is axially moved towards said outlet opening, and spring means for urging said sleeve axially in an opposite direction whereby said fingers are withdrawn from said connector.

5. The apparatus set forth in claim 3 including a manually operated lever shiftably mounted on said housing and engageable with said cam actuator for moving said actuator into engagement with said cam elements, an electric motor for rotatably driving said drive shaft, an electric switch for actuating said motor, said switch being engageable by said lever when the latter is shifted to move said cam actuator, whereby rotation of said drive shaft commences substantially simultaneously with axial movement of said sleeve.

6. The apparatus set forth in claim 4 including a manually operated lever shiftably mounted on said housing and engageable with said cam actuator for moving said actuator into engagement with said cam elements, an electric motor for rotatably driving said drive shaft, an electric switch for actuating said motor, said switch being engageable by said lever when the latter is shifted to move said cam actuator, whereby rotation of said drive shaft commences substantially simultaneously with axial movement of said sleeve.

7. In an apparatus for automatically rotating screw-on connectors onto the stripped ends of electric wires, an elongated housing with an inlet opening at one end for the reception of said connectors and an outlet opening at the other end for the discharge thereof, an axially fixed but rotatable and hollow drive shaft in said housing, said drive shaft having a plurality of slots which define cam surfaces adjacent said outlet opening, said connectors being received in said hollow drive shaft, an axially movable sleeve concentric with and around said drive shaft and rotatable therewith, a plurality of fingers pivotally connected at one end to said sleeve, one finger for each slot, and each finger having a free end extending through its respective slot, manually operated cam means acting between said housing and said sleeve, manually operated lever means for moving said cam means and thereby axially moving said sleeve toward said outlet opening to cause engagement of said fingers with said cam surfaces and inward swinging of said fingers into gripping engagement with a connector located adjacent said outlet opening, and resilient means for urging said sleeve away from said outlet opening.

8. The apparatus set forth in claim 7 further characterized in that said manually operated cam means includes a pair of inter-engaging and cooperating cam elements mounted around said drive shaft for limited relative rotation, one of said elements bearing against said housing and the other element bearing against said sleeve, and a cam actuator engaging said cam elements for urging them to an axially spaced apart position whereby said sleeve is axially moved towards said outlet opening, and wherein said resilient means comprises spring means for urging said sleeve axially in an opposite direction whereby said fingers are released from engagement with said connector.

9. The apparatus set forth in claim 8, including an electric motor for rotatably driving said drive shaft, a switch for actuating said motor, said switch being engageable by said lever when the latter is shifted to move said cam actuator, whereby rotation of said drive shaft commences substantially simultaneously with axial movement of said sleeve.

* * * * *